April 30, 1968 R. D. J. FEASEY ETAL 3,380,678
WEB TRANSPORT SYSTEM

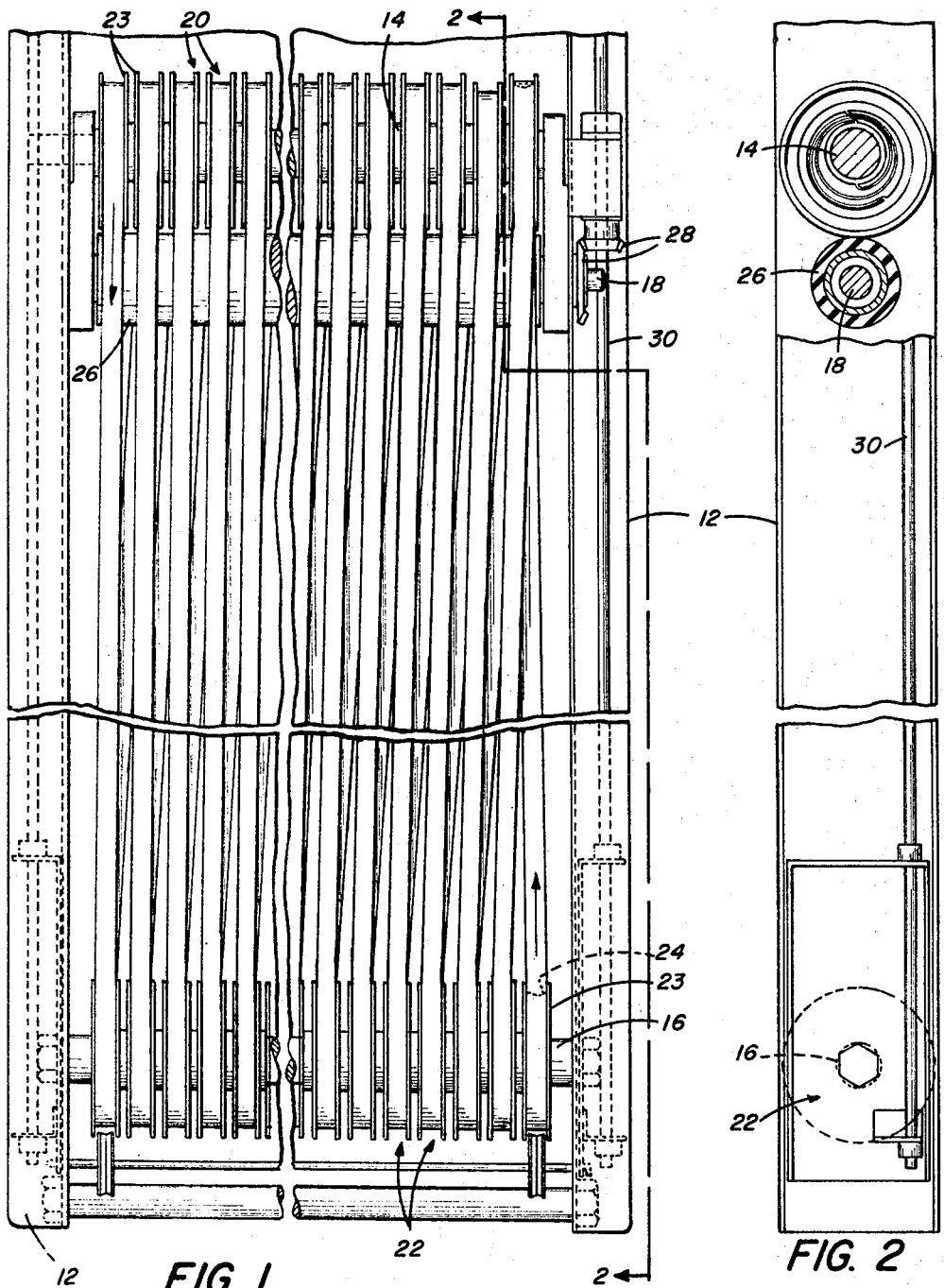

Filed June 6, 1966 2 Sheets-Sheet 2

RAYMOND D. J. FEASEY
LAWRENCE A. ULMSCHNEIDER
INVENTORS

BY *Paul R. Holmes*
*Robert L. Randall*
ATTORNEYS

United States Patent Office 3,380,678
Patented Apr. 30, 1968

3,380,678
WEB TRANSPORT SYSTEM
Raymond D. J. Feasey and Lawrence A. Ulmschneider, Rochester, N.Y., assignors to Eastman Kodak Company, Rochester, N.Y., a corporation of New Jersey
Filed June 6, 1966, Ser. No. 555,362
5 Claims. (Cl. 242—55.01)

This invention relates generally to a tension control mechanism and more specifically to a film tension control mechanism for a drive system used in a photographic processing machine.

In film processing it is the usual practice to run the film in a continuous length through a series of tanks containing processing solutions, rinsing solutions, fixing solutions and wash solutions and to then run it through one or more drying cabinets or chambers. A series of film support spools is provided at the top and the bottom of the tanks and the drying cabinets so that the film forms a multiplicity of loops in passing through each tank and through the drying cabinet. The film may be driven by sprocket wheels located at suitably spaced distances, by driven pacer rolls which pull the film through the processor or through a section of the processor, or by the frictional engagement of the support spools, some of which may be driven, or by a combination of any of these means.

As is well known in the art, the film, as it becomes wet in processing, swells and stretches and subsequently, as it is dried, shrinks to approximately its original size. Since the film must be kept under proper tension, especially in friction drive processors, the support spools must accommodate the variations in film size, and the resulting changes in film tension, as it passes through the tanks. Such tension regulating means must accommodate the stretching and shrinking of the film and generally includes means for enlarging and reducing the size of the film loops or some of the film loops which the film forms as it is wound about the various support spools.

One system of accomplishing this has been to arrange either or both the top and bottom support spools for motion toward each other so as to vary the film loop length therebetween. This motion is generally controlled by biasing means such as weights or springs. However, such arrangements tend to increase the bulk of the processing machines. Furthermore, these arrangements generally require that the force of the weights or spring means be imposed upon the film so that the film may be mechanically stretched by the biasing means while it is wet, thus distorting the images and the sound track carried thereby.

Moreover, as the length of film passing through the processor is significantly increased, as is often desirable in present high capacity processing machines, the friction developed by the support spools may become too great to be overcome by driving only selected spools or by using a pacer roll at the end of each section. Furthermore, as the size of the film being processed is reduced, while the speed of processing is at the same time increased, the film tension must be maintained within closer limits than has heretofore been necessary. Otherwise, the film may not be driven or it may be stretched so tightly as to break, resulting in costly machine shutdown and processing delays.

Accordingly, the present invention is directed to a web transportation device for use in a continuous film processor wherein the film support spools are arranged to be self-supporting and yet capable of a limited amount of deflection under the influence of increased film tension whereby the spools may be moved into contact with driving rolls, which operate to increase the speed of the support spools thus accommodating and tending to reduce the increased film tension.

Accordingly, the present invention provides a generally cylindrical unitary web transport device arranged for rotation about a substantially centrally disposed axis comprising a central hub portion disposed substantially coaxial with the axis and arranged to rotate thereabout, a rigid rim portion disposed about and having a larger diameter than the hub, and at least one flexible member connecting the rim portion to the hub portion whereby the web passing over and in contact with the rim may, when placed under increased tension, displace the rim into contact with a drive roller normally arranged to rotate independently of the spool, which imparts added speed to the rim and the web, thus tending to decrease the web tension downstream therefrom.

Furthermore, the present invention provides a film processor including a first spool shaft and a second spool shaft, each of which support a plurality of film support spools arranged for free rotation thereabout, wherein the film forms a multiplicity of loops around the two sets of support spools. A third shaft, which is driven, is disposed in closely spaced relationship with one of the support spool shafts. The drive shaft is arranged so as to normally not be in contact with the support spools on the adjacent shaft. One or more of the support spools may be constructed as described above and may further be provided with an outer portion arranged to frictionally engage the driving shaft when displaced by the increased tension of the film passing thereover.

The various features of novelty which characterize the present invention are pointed out with particularity in the claims annexed to and forming a part of this specification. For a better understanding of the invention, its operating advantages and the specific objects obtained by its use reference should be had to the accompanying drawing and descriptive matter in which the preferred embodiments of the present invention are illustrated and described.

Of the drawings:

FIG. 1 is a partial elevation of a film processing machine incorporating the present invention;

FIG. 2 is a section of the film processor of the present invention taken along line 2—2 of FIG. 1;

Figure 3:
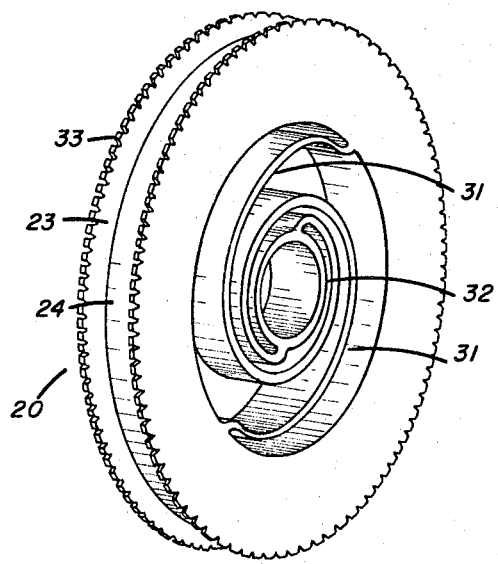
FIG. 3 is an enlarged view of the support spool of the present invention.

A section of the processing machine of the present invention is illustrated in FIG. 1. A pair of support channels 12, which extend the height of the processing machine, are provided with a pair of shafts 14 and 16 which are supported horizontally therebetween. The two shafts are disposed in parallel relationship with one arranged near the upper portion of the support channels 12 and the other near the lower portion. A third shaft 18 is disposed immediately below upper shaft 14 and is rotatably supported at each end in channels 12. Each of shafts 14 and 16 are provided with a plurality of spools 20 and 22, respectively, rotatably mounted thereon. Each of the spools is preferably flanged, as at 23, and is provided with a film support rim 24 which may be undercut, as is well known in the art, to avoid damaging the surface of the film. The general size and shape of the upper and lower spools is similar so that the film may be threaded thereover in a manner well known in the art. Drive shaft 18 may have a friction drive roller 26 mounted thereon, and is driven by a source of power (not shown) through bevel gears 28 and shaft 30. The drive shaft 18 is disposed parallel to the upper shaft 14 at a distance just greater than the sum of the radii of an upper spool 20 and the drive roller 26 so that the upper spools are free to rotate on shaft 14 independently of the drive roller.

Each of the upper spools is formed as illustrated in FIGS. 2 and 3 and has a generally cylindrical substantially rigid central hub portion 32 arranged to rotate freely on shaft 14 coaxial with the axis thereof. The substantially rigid, constant diameter rim portion 24 is disposed about and has a larger diameter than the hub. The rim is integrally connected to the hub by at least one, and as illustrated, two flexible spiral members 31 which permit the rim portion to be deflected radially with respect to the axis of the hub portion. Thus the rim portion may rotate about the hub axis at varying radial distances. As illustrated, the flexible members 31 may be involute in shape permitting the spool to absorb a certain amount of angular displacement without stressing the film. The outer edge of the flange portion 23 of the rim may be provided with a knurled surface 33. The entire spool illustrated may be of a unitary construction and may be molded of polyethylene or other suitable material which can provide the flexibility desired in spiral members 31. Thus, when increased film tension causes the rim portion 24 to deflect, the knurled surface 33 will be moved into contact with the drive roller 26, which may have a high friction outer surface, which will drive the spool so deflected. It will be appreciated that, while only one section of a processing machine is illustrated, several similar sections may be incorporated in the processing machine.

As the film is drawn through the processor, it will be looped continuously between upper spools 20 and lower spools 22 and is usually pulled by a separate feed spool or pacer roll (not shown) at the outlet of the section. Normally, as the film is drawn through a particular section, the only driving force is supplied by the feed spool with the spools 20 and 22 being free to rotate on their respective shafts. However, as tension on the film increases, either due to friction developed by the spools or because of the stretching or tightening of the film due to the processing one or more of the flexible upper spools 20 will be deflected into contact with the driving roller 26 which is operated at a speed slightly greater than that of the feed spool. Thus, the speed of the film passing over the deflected spool is increased, tending to relieve the tension in the film beyond that point. At the same time, the tension in the film preceding the driven spool may be increased sufficiently to deflect the preceding spool into contact with the drive roll. This process will proceed throughout the processor until sufficient correction is made for the increased film tension.

Figure 4:
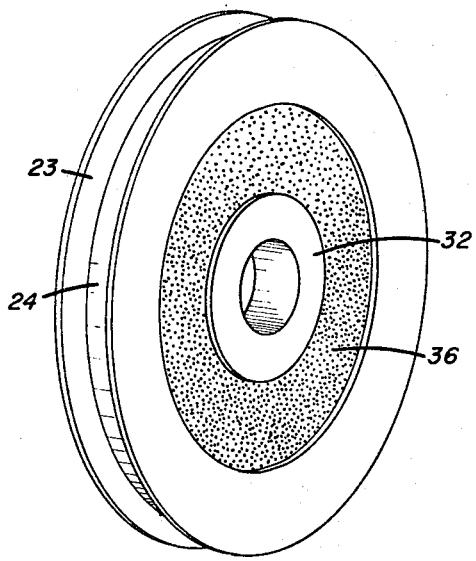
FIG. 4 is an alternative spool arrangement.

An alternate arrangement of the present invention is illustrated in FIG. 4 wherein the outer rigid rim 24 of the spool is connected to the central hub 32 by an annulus of a flexible material 36, such as foam rubber, which likewise permits the radial displacement of the outer rim with respect to the axis. The foam material may be integrally joined to the rim and the hub or a friction joint may be employed. With this arrangement the deflection characteristics of the spool are more uniform.

While the present arrangement has been illustrated in a photographic processor in which the top spools only are driven it will be appreciated that a processor embodying the present invention could be constructed where only the bottom spools are driven or wherein both the top and bottom spools are driven.

It will be noted that the tension in the film processor of the present invention may be maintained within closely defined limits since the amount of deflection necessary to cause the film speed to increase, reducing the tension, is relatively small. Likewise the mass of the spool to be deflected is so small that little or no film stretching is encountered. As a result of the ability to control the film tension within such close limits it is possible to substantially increase the speed of the film passing through the processor without increasing the forces applied to the film. Furthermore, it will be seen that a local variation in the film tension can be readily accommodated without imposing undesirable loads upon the remainder of the film in the system. Moreover, the total film tension in the processor system disclosed is much less than that in prior art systems due to the fact that friction producing arrangements are eliminated.

Furthermore, the radius of the bends in the film is not changed as the spools are deflected since the rim is substantially rigid and has a constant diameter. As a result, the film is not subjected to smaller radius turns which could possibly result in film breakage.

A further advantage of the present arrangement is that the tension in the system may be relatively simply varied during operation merely by varying the position of the drive shaft with respect to the spool shaft. If the drive shaft were to be moved away from the spool shaft more spool deflection would be necessary before the spool would be driven, resulting in a greater amount of tension in the system.

While particular reference has been made to the use of the present invention in film processors, it will be appreciated that it may be advantageously applied to many other web transport systems requiring the same close tension control provided thereby.

The invention has been described in detail with particular reference to preferred embodiments thereof, but it will be understood that variations and modifications can be effected within the spirit and scope of the invention as described hereinabove and as defined in the appended claims.

We claim:

1. A film transport system comprising a shaft, a unitary film support spool arranged for rotation about said shaft and comprising a substantially rigid central hub portion disposed substantially coaxial with said shaft and arranged to rotate thereabout, a substantially rigid constant diameter rim portion disposed about and having a larger diameter than said hub, at least one flexible member connecting said rim portion to said hub portion whereby said rim portion may rotate about said hub at varying radial distances, means for driving said spool comprising a driven roller arranged to rotate independently of said spool and upon radial deflection of said rim portion to contact and drive said spool.

2. A film transport system according to claim 1 wherein said driven roller is disposed upon a second shaft arranged in parallel spaced relationship with said first named shaft, said rim portion having an outer peripheral knurled surface which contacts the driven roller upon radial deflection of said rim portion.

3. A film processor comprising at least one processing tank, a first shaft, a second shaft disposed in the lower portion of said tank below said first shaft, a plurality of film support spools arranged for rotation about said shafts, at least one of said film support spools comprising a substantially rigid central hub portion disposed substantially coaxial with its related shaft and arranged to rotate thereabout, a substantially rigid constant diameter rim portion disposed about and having a larger diameter than said hub, at least one flexible member connecting said rim portion to said hub portion whereby said rim portion may rotate about said hub at varying radial distances, a third shaft disposed in parallel relationship with at least one of said first and second shafts, a drive roller connected to and driven by said third shaft, said drive roller being disposed in alignment with and in spaced relationship to said variable radius film support spool, said drive roller arranged to drive said variable radius film support spool upon deflection of said rim portion by film passing thereover.

4. A film processor according to claim 3 wherein means are provided for varying the distance between said third shaft and said one of said first and second shafts.

5. A film processor according to claim 3 wherein the flexible member is an involute shaped spring.

References Cited

UNITED STATES PATENTS

| 1,749,393 | 3/1930 | Pflimlin | 29—128 X |
| 2,483,422 | 10/1949 | Larson | 29—126 X |
| 2,803,126 | 8/1957 | Meyer | 29—126 X |
| 2,854,197 | 9/1958 | MacNeill | 242—55.12 |

LEONARD D. CHRISTIAN, *Primary Examiner.*